(12) United States Patent
Raschke et al.

(10) Patent No.: US 9,457,505 B2
(45) Date of Patent: Oct. 4, 2016

(54) METHOD FOR MONITORING A TEMPERATURE CONTROL MEDIA SUPPLY

(71) Applicant: ENGEL AUSTRIA GmbH, Schwertberg (AT)

(72) Inventors: Florian Raschke, Ohlsdorf (AT); Klaus Taenzler, Geisenfeld (DE)

(73) Assignee: Engel Austria GmbH, Schwertberg (AT)

( * ) Notice: Subject to any disclaimer, the term of this patent is extended or adjusted under 35 U.S.C. 154(b) by 409 days.

(21) Appl. No.: 14/096,521

(22) Filed: Dec. 4, 2013

(65) Prior Publication Data

US 2014/0175692 A1     Jun. 26, 2014

(30) Foreign Application Priority Data

Dec. 21, 2012   (AT) .................................. 1338/2012

(51) Int. Cl.
    *B29C 45/78*   (2006.01)
    *B29C 45/73*   (2006.01)
    *B29C 45/84*   (2006.01)

(52) U.S. Cl.
    CPC ........... *B29C 45/78* (2013.01); *B29C 45/7306* (2013.01); *B29C 45/84* (2013.01)

(58) Field of Classification Search
    CPC .... B29C 45/73; B29C 45/7306; B29C 45/78
    See application file for complete search history.

(56) References Cited

U.S. PATENT DOCUMENTS

| 4,902,454 A * | 2/1990 | Steinbichler ............ B29C 45/78 |
| | | 264/328.16 |
| 2005/0179157 A1* | 8/2005 | Muranaka ............ B29C 35/007 |
| | | 264/40.6 |
| 2007/0212230 A1 | 9/2007 | Stavale et al. |
| 2012/0241125 A1* | 9/2012 | Hattori ................ B29C 45/7306 |
| | | 165/11.1 |
| 2013/0196015 A1* | 8/2013 | Metsugi .............. B29C 45/7306 |
| | | 425/144 |

FOREIGN PATENT DOCUMENTS

| AT | 12 213 | 1/2012 |
| AT | 511 110 | 9/2012 |
| CN | 1801583 | 7/2006 |
| CN | 101368877 | 9/2010 |
| CN | 201702911 | 1/2011 |

(Continued)

OTHER PUBLICATIONS

Chinese Search Report issued Oct. 9, 2015 in corresponding Chinese Application No. 201310585926.7.

*Primary Examiner* — Jill Heitbrink
(74) *Attorney, Agent, or Firm* — Wenderoth, Lind & Ponack, L.L.P.

(57) ABSTRACT

In a method of monitoring an apparatus for temperature control media supply of a tool of an injection molding machine, the apparatus for temperature control media supply has a feed and a return, between which at least one temperature control conduit is arranged, wherein at least one through-flow sensor is arranged. At least one pressure drop is measured in the at least one temperature control conduit. At least one hydraulic resistance and/or at least one resistance change in the at least one temperature control conduit is calculated on the basis of at least one volume flow measured with the at least one through-flow sensor and on the basis of the at least one measured pressure drop, and the at least one hydraulic resistance and/or the at least one resistance change is visually represented.

27 Claims, 2 Drawing Sheets

(56) References Cited

FOREIGN PATENT DOCUMENTS

| CN | 201916173 | 8/2011 |
| CN | 202399488 | 8/2012 |
| DE | 88 02 462 | 10/1988 |
| DE | 697 06 458 | 4/2002 |
| DE | 100 64 783 | 5/2002 |
| DE | 10 2007 009 301 | 9/2007 |
| DE | 10 2008 003 315 | 7/2009 |
| DE | 10 2009 051 931 | 5/2011 |
| WO | 2012/046752 | * 4/2012 |

* cited by examiner

METHOD FOR MONITORING A TEMPERATURE CONTROL MEDIA SUPPLY

BACKGROUND OF THE INVENTION

The present invention concerns a method of monitoring an apparatus for the temperature control media supply of a tool of an injection molding machine having the features of the classifying portion of claim 1 and such an apparatus having the features of the classifying portion of claim 13.

In plastic processing and in particular in plastic injection molding it is important for the molding tool—referred for brevity as the tool—to be suitably temperature controlled, that is to say for certain temperatures to be kept constant in the tool over the production period by specifically targeted feed and discharge of heat. To achieve that passages are provided in the tool, through which a fluid—in most cases water—flows. Those passages are also referred to as temperature control conduits. Frequently a plurality of passages are supplied with a fluid at the same temperature so that those passages are fed from a feed and, after passing through the tool, are brought together to provide a return. That operation of dividing up and bringing together the fluid is generally effected in distributors in which for example a pressure sensor or through-flow sensors are arranged. As an example mention should be made here of AT 12213 U1 to the present applicant.

It is however also definitely usual for the temperature control conduits to be supplied individually with temperature control medium. A pressure or through-flow sensor is frequently also integrated in the temperature control system with that kind of supply.

Unobserved deposits or blockages entail the risk of a change in the thermal characteristics in the tool as far as damage to the tool in the event of too great a deviation from predetermined temperatures. That is the case both with temperature control media supply with individual temperature control conduits and also with a plurality of temperature control conduits, wherein the problem is worsened in the latter case as deposits and blockages are more difficult to detect.

The following method of identifying deposits or blockages in temperature control systems is known: the through-flow in each temperature control conduit is recorded at a given moment in time as a reference. To detect changes in the hydraulic system the through-flow in each temperature control conduit is again recorded at a later time. If changes can be detected in relation to the reference it is then assumed that there are changes or blockages.

That method has the disadvantage that the pressure in the feed and in the return must be constant. Fluctuations in pressure as frequently occur in practice cannot be taken into account. In practice therefore operation has to be interrupted to measure the quantitative flows and the tool has to be connected to suitable measuring devices to achieve the necessary accuracy.

SUMMARY OF THE INVENTION

The object of the invention is to provide a method which allows reliable detection of blockages and deposits in the temperature control conduits in on-going operation. The invention further seeks to provide an apparatus for carrying out such a method.

That object is attained by a method having the features of claim 1 and an apparatus having the features of claim 13.

The hydraulic resistance in the at least one temperature control conduit can be calculated by the simultaneous measurement of the pressure drop and the volume flow. On the basis of that parameter it is possible to reliably assess whether there are deposits or leakages. In particular the hydraulic resistance is independent of the pressure conditions prevailing in the temperature control conduits and quantitative flow rates. Therefore the hydraulic resistance is also suitable as an identifying parameter during operation. In addition the hydraulic resistance represents a value which is easy to interpret and compare for the operating personnel, whereby the effort and expenditure for training the operating personnel are reduced.

The change in the hydraulic resistance, that is to say the resistance change, is also in many cases a highly suitable identifying parameter. That is the case in particular when a rapid blockage of one or more temperature control conduits represents a risk.

Amongst others a flow coefficient (Kv-value) may serve as a hydraulic resistance.

Further advantageous embodiments of the invention are defined in the appendant claims.

To keep down manufacturing costs the pressure drops in the temperature control conduits can be measured with only one respective pressure sensor in the feed and one pressure sensor in the return. That embodiment is possible even when there are a plurality of parallel temperature control conduits as the pressure drop across circuits arranged in parallel is the same.

For particularly precisely determining the pressure drops the pressure drops can be measured by two respective pressure sensors which are arranged in series in terms of flow in the temperature control conduits.

A particularly preferred embodiment is one in which the at least one hydraulic resistance and/or the at least one resistance change is displayed on a display screen.

To automate the detection of blockages or deposits it can be provided that at least one permitted range is established for the at least one hydraulic resistance of the at least one temperature control conduit and/or at least one permitted change range is established for the at least one resistance change of the at least one temperature control conduit, and a warning signal is produced when the at least one hydraulic resistance leaves the at least one permitted range and/or the at least one resistance change leaves the at least one permitted change range.

For particularly easily determining the permitted ranges or the permitted change ranges measurement or simulation of the hydraulic resistances can be performed before the start of operation.

For reliably communicating the warning signal to the operating personnel it can be produced optically, in particular by representation on a display screen, or it can be produced acoustically as a warning sound.

To prevent the production of defective parts or damage to the tool due to inadequate temperature control it can be provided that the injection molding machine is shut down when the warning signal is produced.

A general formula for calculation of the hydraulic resistance is given by:

$$R = \frac{\Delta p}{\phi^2}$$

wherein R denotes the hydraulic resistance, Δp denotes the pressure drop as a difference in the measured pressures and φ denotes the measured volume flow. Other formulae for determining the hydraulic resistance are also known per se to the man skilled in the art. For example the exponent of the volume flow can be altered to take account of different geometrical conditions which can occur in the conduits.

In some cases it is possible to achieve an increase in the accuracy in determining the hydraulic resistance by measuring a temperature of the temperature control medium and using same for calculating the hydraulic resistance. It is also conceivable for further parameters like the Reynolds number, viscosity or compressibility of the temperature control medium to be incorporated into the calculation.

By virtue of its high thermal capacity water is highly suitable in many cases as the temperature control medium and can therefore be used as the temperature control medium. It will be appreciated however that other media or additives can also be employed.

Usually a closed or open control unit is provided for an apparatus for temperature control media supply, wherein for example closed or open control is effected in accordance with the pressure and/or the volume flow. To particularly accurately maintain predetermined temperatures it can be provided in that case that the target values for the pressure or the volume flow of the temperature control medium are established in dependence on the at least one hydraulic resistance and/or the at least one resistance change.

It will be appreciated that the closed or open control unit as well as the evaluation unit are only logically separated units and can be implemented without any problem in a single physical arrangement. As a rule, in modern injection molding machines, both are integrated in a common machine control.

To establish an optimum condition of a temperature control system the at least one hydraulic resistance can be measured as a reference before operation begins. If geometrical changes occur in a circuit, for example due to deposits or blockages, it is possible to recognize a change in the hydraulic resistance.

Both currently prevailing and also historical hydraulic resistances or changes in resistance can be displayed, whereby those data are accessible to the operating personnel.

BRIEF DESCRIPTION OF THE DRAWINGS

Further advantages and details of the invention will be apparent from the Figures and the related specific description. In the Figures.

DETAILED DESCRIPTION OF THE DRAWINGS

Figure 1:
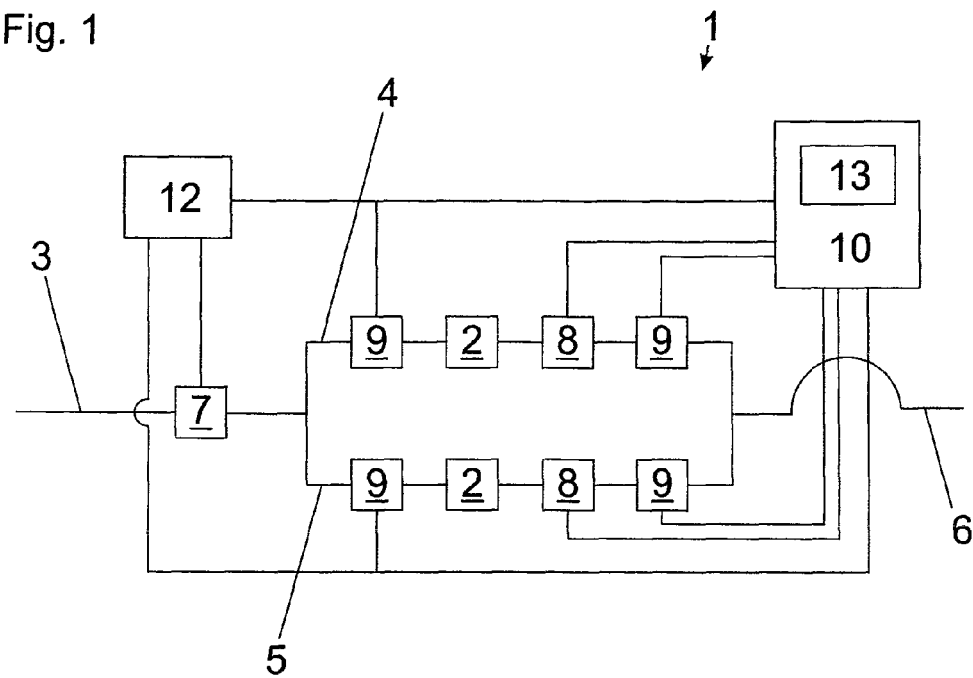
FIG. 1 is a diagrammatic view of an apparatus according to the invention for temperature control media supply with two temperature control conduits.

FIG. 1 firstly shows the feed 3, the temperature control conduits 4 and 5 and the return 6 of the temperature control media supply apparatus 1. The temperature control conduits 4 and 5 pass through the tool 1 which is temperature-controlled thereby. In addition arranged in the temperature control conduits 4 and 5 are two respective pressure sensors 9 and a respective pressure-flow sensor 8 which are respectively connected to the evaluation device 10. The evaluation device 10 has a display screen 13 on which the warning signals or the hydraulic resistances calculated by means of the formula $$R = \frac{\Delta p}{\phi^2}$$

can be represented. In addition a warning signal can be displayed on the display screen 13 if one of the hydraulic resistances R leaves a permitted range.

In this embodiment the quantitative flow rate through the temperature control conduits 4, 5 is closed loop controlled by means of a through-flow regulating valve 7. For that purpose the control device 12 is connected both to the through-flow regulating valve 7 and the two pressure sensors 9.

Figure 2:
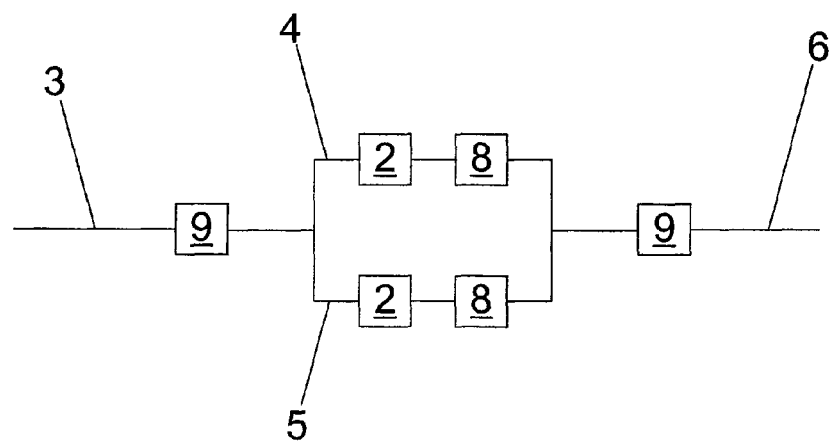
FIG. 2 shows an alternative arrangement for the arrangement of the pressure sensors of the embodiment shown in FIG. 1.

FIG. 2 shows an alternative arrangement of the pressure sensors 9, of which a respective one is arranged in the feed and one in the return, this representing a somewhat less expensive structure. The evaluation device as well as the closed or open control device are not shown as they are to be provided similarly to FIG. 1.

Figure 3:
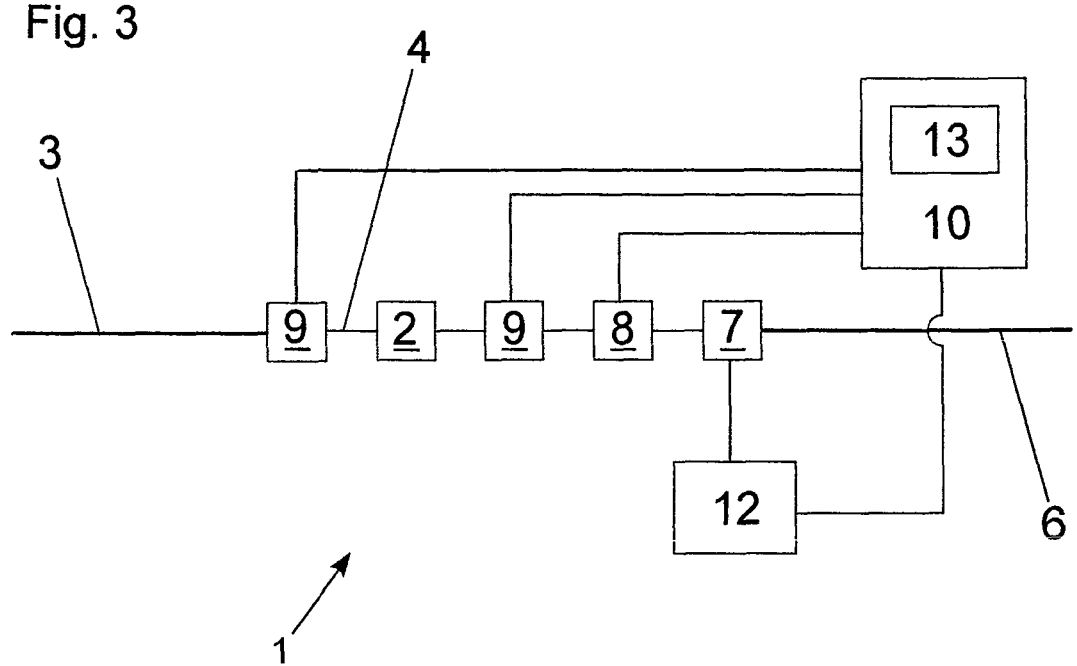
FIG. 3 is a diagrammatic view of an apparatus according to the invention for temperature control media supply with a temperature control conduit.

FIG. 3 shows an embodiment with a single temperature control conduit 4 between the feed 3 and the return 6, the temperature control conduit 4 passing through the tool 2. In this case also there are two series-connected pressure sensors 9 and a through-flow sensor 8 which is connected to the evaluation device 10. In this case also the hydraulic resistance R and the change in resistance are displayed on a display screen 13.

In addition this embodiment has a control device 12 connected to a control member 7. To determine the target value for controlling with incorporation of the hydraulic resistance R the control device 12 is connected to the evaluation device 10.

The present invention is not limited to the illustrated embodiments. In a structure having two or more temperature control conduits for example it is possible to implement any hybrid forms of the arrangements shown here of the pressure sensors, that is to say for example two pressure sensors in the temperature control conduits and a pressure sensor in the return. The through-flow regulating valve can also be arranged in the feed or in the return. In an embodiment with one temperature control conduit it can also pass through the tool a plurality of times.

The invention claimed is:

1. A method of monitoring an apparatus for temperature control media supply of a tool of an injection molding machine, wherein the apparatus for temperature control media supply has a feed and a return, between which at least one temperature control conduit is arranged, wherein at least one through-flow sensor is arranged in each of the at least one temperature control conduit, wherein at least one pressure drop is measured in the at least one temperature control conduit, at least one hydraulic resistance and/or at least one resistance change in the at least one temperature control conduit is calculated on the basis of at least one volume flow measured with the at least one through-flow sensor and on the basis of the at least one measured pressure drop, and the at least one hydraulic resistance and/or the at least one resistance change is visually represented.

2. The method as set forth in claim 1, wherein the at least one pressure drop is measured by a respective pressure sensor in the feed and a pressure sensor in the return.

3. The method as set forth in claim 1, wherein the at least one pressure drop is measured by two respective pressure sensors arranged in series in terms of flow in the at least one temperature control conduit.

4. The method as set forth in claim 1, wherein the at least one hydraulic resistance and/or the at least one resistance change is represented on a display screen.

5. The method as set forth in claim 1, wherein at least one permitted range is established for the at least one hydraulic resistance of the at least one temperature control conduit and/or at least one permitted change range is established for the at least one resistance change of the at least one temperature control conduit, and a warning signal is produced when the at least one hydraulic resistance leaves the at least one permitted range and/or the at least one resistance change leaves the at least one permitted change range.

6. The method as set forth in claim 5, wherein the warning signal is produced optically and/or the warning signal is produced acoustically.

7. The method as set forth in claim 6, wherein the warning signal is produced optically by representation on a display screen.

8. The method as set forth in claim 5, wherein the injection molding machine is shut down when the warning signal is produced.

9. The method as set forth in claim 5, wherein, to determine the at least one permitted range and/or the at least one permitted change range prior to the start of operation, measurement of the at least one hydraulic resistance or a simulation is performed.

10. The method as set forth in claim 1, wherein the at least hydraulic resistance is determined in accordance with the equation:

$$R = \frac{\Delta p}{\phi^2}$$

wherein R denotes the at least one hydraulic resistance, Δp denotes the at least one pressure drop and Φ denotes the at least one volume flow.

11. The method as set forth in claim 1, wherein a temperature of the temperature control medium is measured and the temperature of the temperature control medium is incorporated in the calculation of the at least one hydraulic resistance.

12. The method as set forth in claim 1, wherein water is used as the temperature control medium.

13. The method as set forth in claim 1, wherein at least one control member is open or closed loop controlled in accordance with a target value for a pressure of the temperature control medium and/or for a volume flow of the temperature control medium, wherein the target value is determined based on the at least one hydraulic resistance and/or the at least one resistance change of the at least one temperature control conduit.

14. The method as set forth in claim 13, wherein the at least one control member is a through flow regulating valve.

15. An Apparatus for the temperature control media supply of a tool of an injection molding machine, said apparatus comprising:
    a feed for the central feed of a temperature control medium,
    a return for the central discharge of the temperature control medium,
    at least one temperature control conduit connected to the feed and the return for temperature control of the tool,
    at least one through-flow sensor in each of the temperature control conduits for measuring at least one volume flow,
    an evaluation device connected to the at least one through-flow sensor, and
    at least two pressure sensors connected to the evaluation device for measuring at least one pressure drop, at least one hydraulic resistance and/or at least one resistance change in the at least one temperature control conduit can be calculated on the basis of the at least one measured volume flow and on the basis of the at least one measured pressure drop by the evaluation device and the at least one hydraulic resistance and/or the at least one resistance change can be represented by a visual display device.

16. The apparatus as set forth in claim 15, wherein the at least two pressure sensors include a first pressure sensor arranged in the feed and a second pressure sensor in the return.

17. The apparatus as set forth in claim 15, wherein the at least two pressure sensors are arranged in the at least one temperature control conduit.

18. The apparatus as set forth in claim 15, wherein the visual display device is in the form of a display screen.

19. The apparatus as set forth in claim 15, wherein at least one permitted range for the at least one hydraulic resistance and/or at least one permitted change range for the at least one resistance change of the at least one temperature control conduit is/are storable in the evaluation device, and when the at least one hydraulic resistance leaves the at least one permitted range and/or the at least one resistance change leaves the at least one change range a warning signal can be produced.

20. The apparatus as set forth in claim 19, wherein the warning signal can be produced optically and/or the warning signal can be produced acoustically.

21. The apparatus as set forth in claim 20, wherein the warning signal can be produced optically by representation on a display screen.

22. The apparatus as set forth in claim 19, wherein the injection molding machine can be shut down by the evaluation device when the warning signal is produced.

23. The apparatus as set forth in claim 15, wherein the at least one hydraulic resistance can be determined in accordance with the equation:

$$R = \frac{\Delta p}{\phi^2}$$

wherein R denotes the at least one hydraulic resistance, Δp denotes the at least one pressure drop and Φ denotes the at least one volume flow.

24. The apparatus as set forth in claim 15, further comprising a temperature sensor connected to the evaluation device for measuring a temperature of the temperature control medium, and the at least one hydraulic resistance can be calculated on the basis of the measured temperature.

25. The apparatus as set forth in claim 15, wherein the temperature control medium is water.

26. The apparatus as set forth in claim 15, further comprising at least one control member connected to a closed or open loop control device for open or closed loop controlling the control member in accordance with a target value for a pressure of the temperature control medium and/or for a volume flow of the temperature control medium, wherein the target value can be determined based on the at least one hydraulic resistance and/or the at least one resistance change.

27. The apparatus as set forth in claim 26, wherein the at least one control member is a through-flow regulating valve.

* * * * *